US012586265B2

(12) United States Patent
Zhu et al.

(10) Patent No.: US 12,586,265 B2
(45) Date of Patent: Mar. 24, 2026

(54) LINE DRAWING METHOD, LINE DRAWING APPARATUS, ELECTRONIC DEVICE, AND COMPUTER READABLE STORAGE MEDIUM

(71) Applicant: SHENZHEN HITEVISION TECHNOLOGY CO., LTD., Shenzhen (CN)

(72) Inventors: Lisen Zhu, Beijing (CN); Hongwei Sun, Beijing (CN); Peiqi Zhang, Beijing (CN)

(73) Assignee: SHENZHEN HITEVISION TECHNOLOGY CO., LTD., Shenzhen (CN)

( * ) Notice: Subject to any disclaimer, the term of this patent is extended or adjusted under 35 U.S.C. 154(b) by 190 days.

(21) Appl. No.: 18/291,931

(22) PCT Filed: Dec. 29, 2021

(86) PCT No.: PCT/CN2021/142560
§ 371 (c)(1),
(2) Date: Jan. 25, 2024

(87) PCT Pub. No.: WO2023/005139
PCT Pub. Date: Feb. 2, 2023

(65) Prior Publication Data
US 2024/0371056 A1    Nov. 7, 2024

(30) Foreign Application Priority Data
Jul. 30, 2021    (CN) .......................... 202110874236.8

(51) Int. Cl.
*G06T 11/23*        (2026.01)
*G06F 3/01*         (2006.01)
*G06T 7/73*         (2017.01)

(52) U.S. Cl.
CPC .............. *G06T 11/23* (2026.01); *G06F 3/011* (2013.01); *G06T 7/73* (2017.01); (Continued)

(58) Field of Classification Search
CPC .................... G06T 11/203; G06T 7/73; G06T 2207/10016; G06T 2207/20048; G06T 2207/30196; G06F 3/011
See application file for complete search history.

(56) References Cited

U.S. PATENT DOCUMENTS 5,596,692 A * 1/1997 Martin ................ G06F 3/04845
                                                    345/443
11,380,028 B2 * 7/2022 Thimbleby ............. G06T 11/60
(Continued)

FOREIGN PATENT DOCUMENTS

CN      105320434 A      2/2016
CN      105468180 A      4/2016
(Continued)

OTHER PUBLICATIONS

The International search report for PCT Application No. PCT/CN2021/142560, dated Apr. 13, 2022, 4 pages.
(Continued)

*Primary Examiner* — Yu Chen
(74) *Attorney, Agent, or Firm* — East IP P.C.

(57) ABSTRACT

The embodiments of the present application disclose a line drawing method, a line drawing apparatus, a device, and a storage medium. Under a condition that at least one of an abscissa transformation value and an ordinate transformation value is not less than a first set threshold, a corresponding line is drawn according to an association relationship among the abscissa transformation value, the ordinate transformation value, a preconfigured transformation value coefficient, and a transformation value threshold.

15 Claims, 5 Drawing Sheets

(52) U.S. Cl.
CPC .............. *G06T 2207/10016* (2013.01); *G06T 2207/20048* (2013.01); *G06T 2207/30196* (2013.01)

(56) References Cited

U.S. PATENT DOCUMENTS

| | | | | |
|---|---|---|---|---|
| 2008/0001966 A1* | 1/2008 | Zhang | ................... | G06T 11/203 |
| | | | | 345/623 |
| 2012/0050293 A1* | 3/2012 | Carlhian | .............. | G06T 11/203 |
| | | | | 345/442 |
| 2015/0302617 A1* | 10/2015 | Shimura | .............. | G06T 11/203 |
| | | | | 345/441 |
| 2019/0361562 A1* | 11/2019 | Han | .................... | G06F 3/03545 |
| 2021/0081029 A1* | 3/2021 | Dong | .................. | G06V 40/113 |
| 2022/0300150 A1* | 9/2022 | Hori | ...................... | G06F 3/0481 |
| 2023/0298292 A1* | 9/2023 | Sasaki | .................. | G06T 19/006 |
| | | | | 345/419 |
| 2024/0371056 A1* | 11/2024 | Zhu | ........................ | G06F 3/017 |

FOREIGN PATENT DOCUMENTS

| | | | |
|---|---|---|---|
| CN | 108446032 | A | 8/2018 |
| CN | 108932053 | A | 12/2018 |
| CN | 109582929 | A | 4/2019 |
| CN | 110750160 | A | 2/2020 |
| CN | 112684895 | A | 4/2021 |
| CN | 112884864 | A | 6/2021 |
| CN | 113610944 | A | 11/2021 |
| CN | 104145303 | A | 11/2024 |
| JP | 2014186682 | A | 10/2014 |
| KR | 101 4040 18 | B1 | 6/2014 |

OTHER PUBLICATIONS

The extended European search report for European Application No. 21951711.7, dated Sep. 24, 2024, 10 pages.
The First Office Action for CN Application No. 202110874236.8, dated Jan. 31, 2024, 15 pages.

* cited by examiner

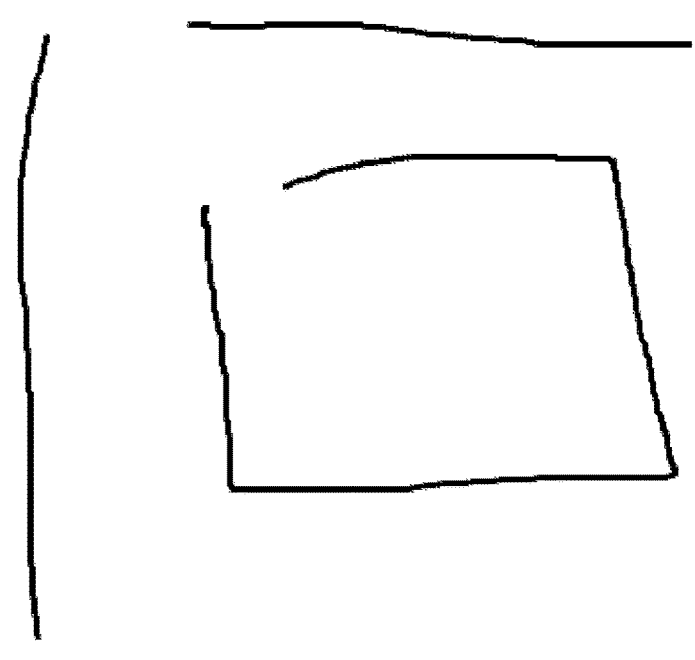

Fig. 1

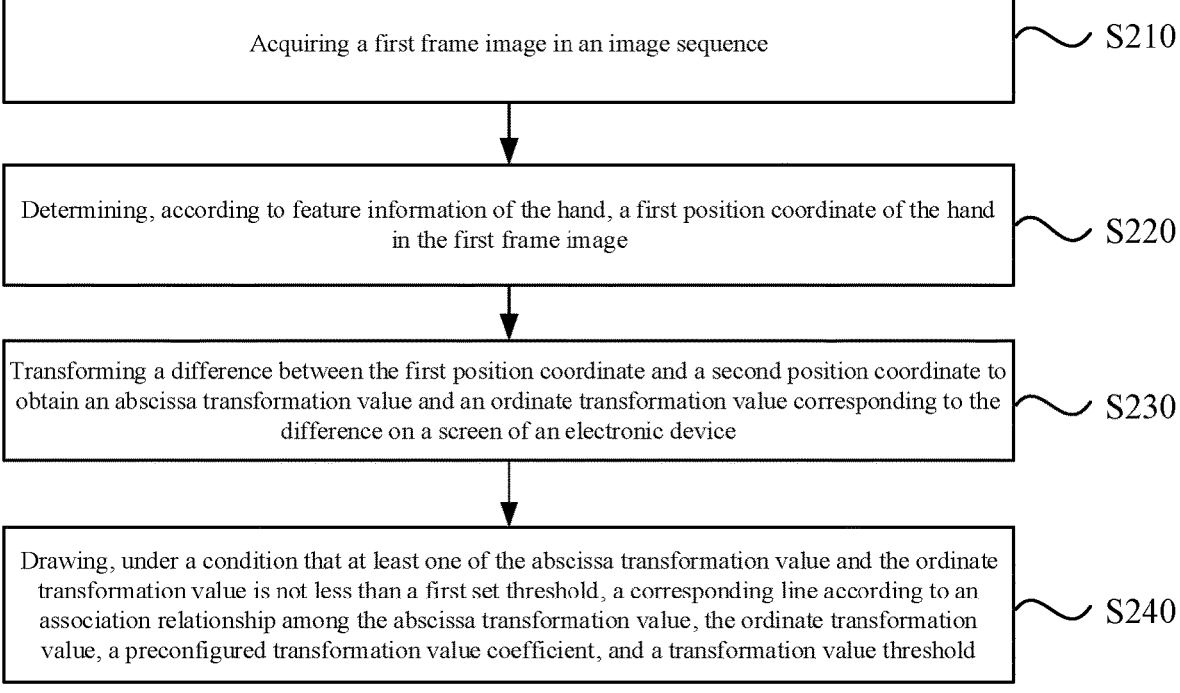

| | |
|---|---|
| Acquiring a first frame image in an image sequence | S210 |
| Determining, according to feature information of the hand, a first position coordinate of the hand in the first frame image | S220 |
| Transforming a difference between the first position coordinate and a second position coordinate to obtain an abscissa transformation value and an ordinate transformation value corresponding to the difference on a screen of an electronic device | S230 |
| Drawing, under a condition that at least one of the abscissa transformation value and the ordinate transformation value is not less than a first set threshold, a corresponding line according to an association relationship among the abscissa transformation value, the ordinate transformation value, a preconfigured transformation value coefficient, and a transformation value threshold | S240 |

Fig. 2

LINE DRAWING METHOD, LINE DRAWING APPARATUS, ELECTRONIC DEVICE, AND COMPUTER READABLE STORAGE MEDIUM

CROSS-REFERENCE TO RELATED APPLICATION

The present application is a National Stage of International Application No. PCT/CN2021/142560 filed on Dec. 29, 2021, which claims priority to Chinese Patent Application No. 202110874236.8 filed on Jul. 30, 2021, both of which are hereby incorporated by reference in their entireties.

TECHNICAL FIELD

Embodiments of the present application relate to the field of computer technology, and more particularly, to a line drawing method, a line drawing apparatus, an electronic device, and a computer readable storage medium.

BACKGROUND

Bare-handed remote control is a technology by which an electronic device can be remotely controlled within a certain range without using a control device such as a remote controller or a traditional input and output device such as a mouse and a keyboard. With the development of computer technology, more and more electronic devices support the bare-handed remote control.

It is now common to control movement of a cursor on a screen of an electronic device by a hand. For example, a line may be drawn on the screen by the hand.

Under a condition that the line is drawn by the hand, a conventional way is to draw a line based on a motion trajectory of the hand in a current frame image, but the hand is often unstable due to inertia or the like, thereby causing the drawn line to be unstable.

SUMMARY

Embodiments of the present application provide a line drawing method, a line drawing apparatus, an electronic device, and a computer readable storage medium.

In a first aspect, the embodiments of the present application provide a line drawing method, including:

acquiring a first frame image in an image sequence, wherein the first frame image includes a hand of a user;

determining, according to feature information of the hand, a first position coordinate of the hand in the first frame image;

transforming a difference between the first position coordinate and a second position coordinate to obtain an abscissa transformation value and an ordinate transformation value corresponding to the difference on a screen of an electronic device, wherein the second position coordinate is a position coordinate of the hand in a second frame image, and the second frame image is an image before the first frame image in the image sequence; and drawing, under a condition that at least one of the abscissa transformation value and the ordinate transformation value is not less than a first set threshold, a corresponding line according to an association relationship among the abscissa transformation value, the ordinate transformation value, the ordinate transformation value, a preconfigured transformation value coefficient, and a transformation value threshold.

In some embodiments, the transformation value coefficient includes an abscissa transformation value coefficient and an ordinate transformation value coefficient, and the transformation value threshold includes an abscissa transformation value threshold and an ordinate transformation value threshold;

drawing the corresponding line according to the association relationship among the abscissa transformation value, the ordinate transformation value, the preconfigured transformation value coefficient, and the transformation value threshold includes:

drawing, under a condition that a product of the abscissa transformation value coefficient and the ordinate transformation value coefficient is a first preset value, the abscissa transformation value threshold is a second preset value, and the ordinate transformation value threshold is a third preset value, a straight line of a target length starting from an end of an initial line, wherein the initial line is a line drawn according to an image before the first frame image in the image sequence, and the target length corresponds to the abscissa transformation value or the ordinate transformation value.

In some embodiments, drawing the straight line of the target length starting from the end of the initial line includes:

drawing, under a condition that the abscissa transformation value is greater than or equal to a product of the abscissa transformation value coefficient and the ordinate transformation value, and the ordinate transformation value is less than the ordinate transformation value threshold, a line segment of a first target length starting from the end of the initial line along a horizontal direction, wherein the first target length corresponds to the abscissa transformation value.

In some embodiments, drawing the straight line of the target length starting from the end of the initial line includes:

drawing, under a condition that the ordinate transformation value is greater than or equal to a product of the ordinate transformation value coefficient and the abscissa transformation value, and the abscissa transformation value is less than the abscissa transformation value threshold, a line segment of a second target length starting from the end of the initial line along a vertical direction, wherein the second target length corresponds to the ordinate transformation value.

In some embodiments, the transformation value coefficient includes an abscissa transformation value coefficient and an ordinate transformation value coefficient, and the transformation value threshold includes an abscissa transformation value threshold and an ordinate transformation value threshold;

drawing the corresponding line according to the association relationship among the abscissa transformation value, the ordinate transformation value, the preconfigured transformation value coefficient, and the transformation value threshold includes:

under a condition that the abscissa transformation value coefficient is a fourth preset value, the ordinate transformation value coefficient is a fifth preset value, the abscissa transformation value threshold is a sixth preset value, and the ordinate transformation value threshold is a seventh preset value, and under a condition that the abscissa transformation value is greater than or equal to a product of the abscissa transformation value coefficient and the ordinate transformation value, the abscissa transformation value is less than the abscissa transformation value threshold, the ordinate transformation value is greater than or equal to a product of the ordinate transformation value coefficient and the abscissa transformation value, and the ordinate transformation value is less than the ordinate transformation value threshold, drawing a curved line starting from an end of an initial line and ending at the first position coordinate, wherein the initial line is a line drawn according to an image before the first frame image in the image sequence.

In some embodiments, the transformation value coefficient includes an abscissa transformation value coefficient and an ordinate transformation value coefficient, and the transformation value threshold includes an abscissa transformation value threshold and an ordinate transformation value threshold; and drawing the corresponding line according to the association relationship among the abscissa transformation value, the ordinate transformation value, the preconfigured transformation value coefficient, and the transformation value threshold includes:

drawing, under a condition that the abscissa transformation value coefficient is less than a second set threshold, the ordinate transformation value coefficient is less than a third set threshold, the abscissa transformation value threshold is less than a fourth set threshold, and the ordinate transformation value threshold is less than a fifth set threshold, a straight line or a curved line starting from an end of the initial line, wherein the initial line is a line drawn according to an image before the first frame image in the image sequence.

In some embodiments, the method further includes: under a condition that both the abscissa transformation value and the ordinate transformation value are less than a first set threshold, accumulating the abscissa transformation value with a preconfigured initial abscissa value to obtain an accumulated abscissa value, and accumulating the ordinate transformation value with a preconfigured initial ordinate value to obtain an accumulated ordinate value; and drawing, under a condition that at least one of the accumulated abscissa value and the accumulated ordinate value is greater than a sixth set threshold, a straight line of a target length starting from an end of an initial line, wherein the initial line is a line drawn according to an image before the first frame image in the image sequence, and the target length corresponds to the accumulated abscissa value or the accumulated ordinate value.

In some embodiments, drawing the straight line of the target length starting from the end of the initial line includes:

drawing, under a condition that the accumulated abscissa value is greater than the accumulated ordinate value, a line segment of a third target length starting from the end of the initial line along a horizontal direction, wherein the third target length corresponds to the accumulated abscissa value; and drawing, under a condition that the accumulated abscissa value is less than or equal to the accumulated ordinate value, a line segment of a fourth target length starting from the end of the initial line along a vertical direction, wherein the fourth target length corresponds to the accumulated ordinate value.

In a second aspect, the embodiments of the present application provide a line drawing apparatus, including:

an image acquisition module configured to acquire a first frame image in an image sequence, wherein the first frame image includes a hand of a user;

a position coordinate determination module configured to determine, according to feature information of the hand, a first position coordinate of the hand in the first frame image;

a difference transformation module configured to transform a difference between the first position coordinate and a second position coordinate to obtain an abscissa transformation value and an ordinate transformation value corresponding to the difference on a screen of an electronic device, wherein the second position coordinate is a position coordinate of the hand in a second frame image, and the second frame image is an image before the first frame image in the image sequence; and a line drawing module configured to draw, under a condition that at least one of the abscissa transformation value and the ordinate transformation value is not less than a first set threshold, a corresponding line according to an association relationship among the abscissa transformation value, the ordinate transformation value, a preconfigured transformation value coefficient, and a transformation value threshold.

In a third aspect, the embodiments of the present application provide an electronic device, including:

a camera module configured to acquire an image;

a display screen configured to display a line;

a processor; and a memory for storing computer program instructions;

wherein the computer program instructions, when executed by the processor, implement the method according to the first aspect.

In a fourth aspect, the embodiments of the present application provide a computer readable storage medium having computer program instructions stored thereon, wherein the computer program instructions, when executed by a processor, implement the method according to the first aspect.

BRIEF DESCRIPTION OF THE DRAWINGS

In order to illustrate technical solutions of embodiments of the present application more clearly, the drawings required for the embodiments of the present application will be briefly described. For a person skilled in the art, other drawings can also be obtained from these drawings without any inventive effort.

FIG. 1 is a schematic view of a line drawn based on the related art;

FIG. 2 is a flowchart of a line drawing method according to an embodiment of the present application;

DETAILED DESCRIPTION

Figure 3:
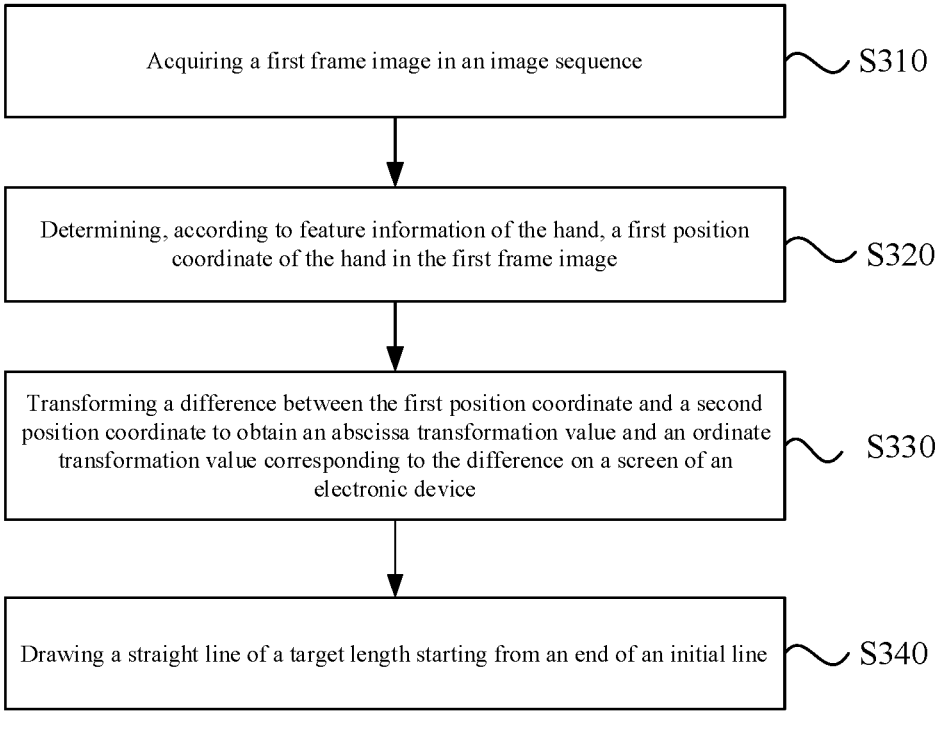
FIG. 3 is a flowchart of another line drawing method according to an embodiment of the present application.

Features and exemplary embodiments of various aspects of the present application will be described in detail below. In order to make the objects, technical solutions and advantages of the present application clearer, the present application is further described in detail below with reference to the accompanying drawings and embodiments. It should be understood that the specific embodiments described herein are only configured to explain the present application, but not to limit the present application. For those skilled in the art, the present application can be implemented without some of these specific details. The following description of the embodiments is only to provide a better understanding of the present application by illustrating examples of the present application.

It should be noted that, in the present application, the relational terms, such as first and second, are used merely to distinguish one entity or operation from another entity or operation, without necessarily requiring or implying any actual such relationships or orders for these entities or operations. Moreover, the terms "comprise", "include", or any other variants thereof, are intended to represent a non-exclusive inclusion, such that a process, method, article or device including a series of elements includes not only those elements, but also other elements that are not explicitly listed or elements inherent to such a process, method, article or device. Without further limitation, an element preceded by "including . . . " does not exclude presence of additional similar elements in a process, a method, an article or a device including the element.

An example is given in which a line is drawn according to a motion trajectory of a hand, and in certain scenarios, a user may need to draw a particular line, such as a straight line, or a curved line.

Under a condition that a conventional way is used to draw a line based on the motion trajectory of the hand, the drawn line is unstable due to inertia of the hand or a habitual action of the user. For example, under a condition that the straight line is drawn, a movement trajectory of the hand is an arc, causing that the drawn line is not a straight line; and under a condition that the curved line is drawn, the line is not smooth due to shaking of the hand.

In an example, with reference to FIG. 1, an example is given in which a horizontal straight line and a vertical straight line are drawn, and the hand is unstable during movement due to the inertia, so that lines that are actually drawn are not straight lines, thereby failing to satisfy user's requirement.

To this end, the embodiments of the present application provide a line drawing method that can be used to draw a stable line. In the line drawing method according to the embodiments of the present application, a executing body may be a line drawing apparatus, or a module in the line drawing apparatus configured to perform the line drawing method. The line drawing apparatus may exist independently, or may be integrated in an electronic device, and the electronic device may be a smart device such as a notebook, a desktop, an interactive electronic white board, or the like that has a data processing function.

An example in which the electronic device performs the line drawing method is given in the embodiments of the present application to illustrate the line drawing method according to the embodiments of the present application in detail.

FIG. 2 is a flowchart of a line drawing method according to an embodiment of the present application.

As shown in FIG. 2, the line drawing method may include the following steps:

S210, acquiring a first frame image in an image sequence, in which the first frame image includes a hand of a user;

S220, determining, according to feature information of the hand, a first position coordinate of the hand in the first frame image;

S230, transforming a difference between the first position coordinate and a second position coordinate to obtain an abscissa transformation value and an ordinate transformation value corresponding to the difference on a screen of an electronic device, in which the second position coordinate is a position coordinate of the hand in a second frame image, and the second frame image is an image before the first frame image in the image sequence; and S240, drawing, under a condition that at least one of the abscissa transformation value and the ordinate transformation value is not less than a first set threshold, a corresponding line according to an association relationship among the abscissa transformation value, the ordinate transformation value, a preconfigured transformation value coefficient, and a transformation value threshold.

Accordingly, under a condition that at least one of the abscissa transformation value and the ordinate transformation value is not less than the first set threshold, the corresponding line is drawn according to the association relationship among the abscissa transformation value, the ordinate transformation value, the preconfigured transformation value coefficient, and the transformation value threshold. That is, in the embodiments of the present application, when drawing the line, not only position changes of the hand in different frame images are considered, but also the association relationship among the position changes, the transformation value coefficient, and the transformation value threshold is considered. Therefore, when drawing the line, only a line corresponding to the association relationship can be drawn, and a line unrelated to the association relationship cannot be drawn. Thus, a situation in which the line that is actually drawn is inconsistent with the type of the line due to inertia or the like can be avoided, thereby ensuring the stability of the line.

The above step is described in detail as follows:

In S210, the image sequence may be a sequence formed by arranging a plurality of images in a certain order. For example, the images may be arranged according to acquisition time of the images to obtain the image sequence.

In one embodiment, images contained in the image sequence may be acquired from a web page or a local image database, or may be acquired by a device having an image acquisition function, and the device having the image acquisition function may be a camera integrated in the electronic device, or may be a device separate from the electronic device, such as a mobile phone, a camera, or the like.

Under a condition that the device having the image acquisition function is separate from the electronic device, the device having the image acquisition function may communicate with the electronic device to send the acquired image to the electronic device, so that to a basis is provided for a subsequent electronic device to draw a line.

In one embodiment, the images contained in the image sequence may further be obtained from a video, and the video may be captured by the device having the image acquisition function, or may be acquired from a video database of the electronic device.

In the image sequence of the embodiments of the present application, each image contains a hand of a user, and hands contained in the images in the same image sequence belong to the same user.

In addition to the hand of the user, each image may include other parts of the user or objects other than the user, which is not specifically limited here.

The first frame image is an image in the image sequence. For example, one image may be selected from the image sequence and used as the first frame image according to requirements.

In S220, the feature information of the hand may be information uniquely identifying the hand. For example, the feature information may be key points of the hand, and the key points of the hand may include a joint point, a fingertip, a palm heel, a palm center, and the like.

The first position coordinate is a position coordinate of the hand in the first frame image. In one embodiment, one key point may be selected from the key points of the hand, and a position coordinate of the key point is used as the position coordinate of the hand in the first frame image.

For example, a position coordinate of the palm center is used as the position coordinate of the hand in the first frame image, which is simple and convenient.

In one embodiment, a plurality of key points may be selected from the key points of the hand, and the position coordinate of the hand in the first frame image is determined based on position coordinates of the plurality of key points.

For example, the position coordinates of the plurality of key points may be averaged to obtain an average point, and a position coordinate of the average point may be used as the position coordinate of the hand in the first frame image.

Using the position coordinates of the plurality of key points to determine the position coordinate of the hand can improve accuracy of the position coordinate of the hand.

In one embodiment, a point in the hand that has a relatively small position coordinate change may be determined by comparing the first frame image with other images in the image sequence, and the position coordinate of the hand in the first frame image may be determined according to the point that has the relatively small position coordinate change.

For example, under a condition that there are a plurality of points that have a relatively small position change, the plurality of points that have the relatively small position change may be averaged to obtain an average point, and a position coordinate of the average point may be used as the position coordinate of the hand in the first frame image, thereby improving the accuracy of the position coordinate of the hand.

In one embodiment, position coordinates of the points of the hand may be determined by a positioning model, and the positioning model may be a deep neural network model.

For example, an image containing the hand of the user may be input into the deep neural network model, and positions of pixel points of the hand in the image may be output by the deep neural network model as position coordinates of respective points of the hand.

Of course, the position coordinates of the points of the hand may further be determined in other ways, which is not particularly limited by the embodiments of the present application.

In one embodiment, after the position coordinates of the points of the hand are obtained, a smoothing process may be performed on the position coordinates of the points by a filtering technique, and abrupt points or sharp points in these points are removed. Therefore, when determining the first position coordinate of the hand, the accuracy of the first position coordinate can be improved, and the accuracy of a subsequent line can be further improved.

In S230, the second position coordinate is the position coordinate of the hand in the second frame image, and a determination process of the second position coordinate is the same as the determination process of the first position coordinate, which is not repeated here for the sake of brevity.

In one embodiment, the second frame image may be a previous frame image of the first frame image. For example, the image sequence includes images numbered 1 to 10, the smaller the number is, the earlier the corresponding acquisition time is, and it is assumed that the first frame image is an image numbered 5, the second frame image may be an image numbered 4. Accordingly, the line may be drawn on a real-time basis according to the change of the hand in an adjacent image, so as to ensure the accuracy of the line.

Considering that there may be a certain difference between a size of an image in reality and a size of a screen of an electronic device, in order to better present the drawn line in the screen for convenience of the user, in one embodiment, the difference between the first position coordinate and the second position coordinate may be transformed into the screen of the electronic device.

The transformation here may be a zoom-in transformation or a zoom-out transformation, depending on a size of the first frame image and the size of the screen.

In one embodiment, the difference between the first position coordinate and the second position coordinate may be transformed by a transformation factor, and the transformation factor may be determined based on a mapping relationship between a size of an image and a size of a screen. For example, the transformation factor in the embodiments of the present application may be determined based on a mapping relationship between the size of the first frame image and the size of the screen of the electronic device.

An example of a two-dimensional coordinate is given, the difference here may include an abscissa difference and an ordinate difference, accordingly, the transformation factor may comprise an abscissa transformation factor and an ordinate transformation factor, and the abscissa transformation factor and the ordinate transformation factor may be the same or different.

The abscissa transformation value is a transformation value obtained by transforming the abscissa difference based on the abscissa transformation factor; and the ordinate transformation value is a transformation value obtained by transforming the ordinate difference based on the ordinate transformation factor. The abscissa transformation value and the ordinate transformation value may be constants containing no sign.

In S240, for example, the first set threshold may be 1, that is, under a condition that at least one of the abscissa transformation value and the ordinate transformation value is greater than or equal to 1, the corresponding line is drawn according to the association relationship among the abscissa transformation value, the ordinate transformation value, the preconfigured transformation value coefficient, and the transformation value threshold.

The transformation value coefficient and the transformation value threshold may be used to indicate types of lines allowed to be drawn in different application scenarios, and different transformation value coefficients and different transformation value thresholds may be set in different application scenarios. Accordingly, when drawing a line in an application scenario, only the line corresponding to the application scenario can be obtained, so as to avoid the situation that the actual drawn lines do not satisfy the requirement due to inertia of the hand, or the like, thereby satisfying user's actual requirement.

Under a condition that the transformation value coefficient and the transformation value threshold are determined, it means that the type of a line allowed to be drawn in a current application scenario is known, and under this condition, a specific line may be drawn further according to the relationship among the abscissa transformation value, the ordinate transformation value, the transformation value coefficient, and the transformation value threshold.

For example, under a condition that only a straight line is allowed to be drawn in the current application scenario, whether to draw a horizontal straight line or a vertical straight line may be determined further according to the relationship among the abscissa transformation value, the ordinate transformation value, the transformation value coefficient, and the transformation value threshold.

An example is given in which an image is acquired by the device having the image acquisition function, and it should be understood that, under a condition that the device acquires the image, the hand of the user is not necessarily contained in the acquired image. Based on this, in one embodiment, before S210, the method may further include:

acquiring images acquired by the device having the image acquisition function;

processing the images to determine images containing a hand of a user; and arranging the images containing the hand of the user in a chronological order to obtain an image sequence.

In one embodiment, the image may be identified by a feature identification algorithm to determine whether the image contains the hand of the user.

In one embodiment, whether the image contains the hand of the user may also be determined by a way of deep learning. For example, the image may be input into a neural network model built in advance, the result is output by the neural network model built in advance, and the result is used to indicate whether the image contains the hand of the user.

Considering that a defect such as interference and unclearness may exist in the actual acquired image, in order to improve the accuracy of the position coordinate of the hand, in one embodiment, after the image acquired by the device having the image acquisition function is acquired, the acquired image may be preprocessed to improve image quality.

For example, a preprocessing such as filtering, noise reduction, scaling, enhancement, and the like may be performed on the acquired image.

An example is given in which the first set threshold is 1, and under a condition that at least one of the abscissa transformation value and the ordinate transformation value is not less than 1, one or more of the straight line and the curved line may be drawn by configuring the transformation value coefficient and the transformation value threshold.

Here, the transformation value coefficient may include the abscissa transformation value coefficient and the ordinate transformation value coefficient, and the transformation value threshold may include the abscissa transformation value threshold and the ordinate transformation value threshold.

For convenience of description, the abscissa transformation value is marked as Dx, the ordinate transformation value is marked as Dy, the abscissa transformation value coefficient is marked as Cx, the ordinate transformation value coefficient is marked as Cy, the abscissa transformation value threshold is marked as Tx, and the ordinate transformation value threshold is marked as Ty.

In one embodiment, the straight line may be drawn under a condition that a product of Cx and Cy is the first preset value, Tx is the second preset value, and Ty is the third preset value.

The first preset value may be 1, and the second preset value and the third preset value may be constants with relatively great values, such as constants greater than 100, and the second preset value and the third preset value may be the same or different.

Based on this, in one embodiment, as shown in FIG. 3, the line drawing method according to the embodiments of the present application may further include the following steps:

S310, acquiring a first frame image in an image sequence;

S320, determining, according to feature information of the hand, a first position coordinate of the hand in the first frame image;

S330, transforming a difference between the first position coordinate and a second position coordinate to obtain an abscissa transformation value and an ordinate transformation value corresponding to the difference on a screen of an electronic device; and S340, drawing a straight line of a target length starting from an end of an initial line, in which the initial line is a line drawn according to an image before the first frame image in the image sequence, and the target length corresponds to Dx or Dy.

The processes of S310-S330 are the same as the processes of S210-S230 in FIG. 2, and specific reference may be made to the description of S210-S230, which is not repeated here for the sake of brevity.

Other steps in FIG. 3 are described in detail as follows:

In S340, the end of the initial line is a position where the cursor on the screen is currently located, and the cursor on the screen moves following the line.

The target length is related to the type of the straight line. For example, under a condition that the horizontal straight line is drawn, the target length corresponds to Dx; and under a condition that the vertical straight line is drawn, the target length corresponds to Dy.

Here, the correspondence may mean that the target length is the same as Dx or Dy, or that the target length is a multiple of Dx or Dy.

In one embodiment, under a condition that Dx is greater than or equal to a product of Cx and Dy, and Dy is less than Tx, a line segment of a first target length starting from the end of the initial line is drawn along the horizontal direction, and the first target length corresponds to Dx.

Under a condition that Dx is greater than or equal to the product of Cx and Dy, and Dy is less than Tx, it is considered that a distance the hand moves along the horizontal direction is greater than a distance the hand moves along the vertical direction; under a condition that only the straight line is allowed to be drawn, the distance the hand moves along the vertical direction may be ignored, and a line segment along the horizontal direction is obtained, thereby satisfying user's requirement of drawing a horizontal straight line.

In one embodiment, under a condition that Dy is greater than or equal to a product of Cy and Dx, and Dx is less than Tx, a line segment of a second target length starting from the end of the initial line is drawn along the vertical direction, and the second target length corresponds to the ordinate transformation value.

Under a condition that Dy is greater than or equal to the product of Cy and Dx, and Dx is less than Tx, it is considered that a distance the hand moves along the vertical direction is greater than a distance the hand moves along the horizontal direction; under a condition that only the straight line is allowed to be drawn, the distance the hand moves along the horizontal direction may be ignored, and a line segment along the vertical direction is obtained, thereby satisfying user's requirement of drawing a vertical straight line.

In one embodiment, under a condition that Dx and Dy do not satisfy the above conditions, the user may be prompted to adjust Dx or Dy to satisfy the above conditions for drawing the horizontal straight line or the vertical straight line.

For example, a prompt message reading "under a condition that a horizontal straight line needs to be drawn, please increase Dx; under a condition that a vertical straight line needs to be drawn, please increase Dy" may be shown to the user, and content of the prompt message is related to sizes of Dx and Dy.

Accordingly, an actual horizontal straight line or an actual vertical straight line may be drawn according to the relationship among the abscissa transformation value, the ordinate transformation value, the transformation value coefficient, and the transformation value threshold, so as to satisfy user's requirement, and avoid a situation that the line is bent or has an arc due to the inertia of the hand, thereby improving the stability of the line.

In one embodiment, a curved line may be drawn under a condition that Cx is a fourth preset value, Cy is a fifth preset value, Tx is a sixth preset value, and Ty is a seventh preset value.

The fourth preset value and the fifth preset value may be for example 0, the sixth preset value and the seventh preset value may be constants with relatively great values, such as constants greater than 100, the sixth preset value and the seventh preset value may be the same or different, and the sixth preset value and the seventh preset value may be the same as or different from the second preset value and the third preset value in the above embodiments.

Figure 4:
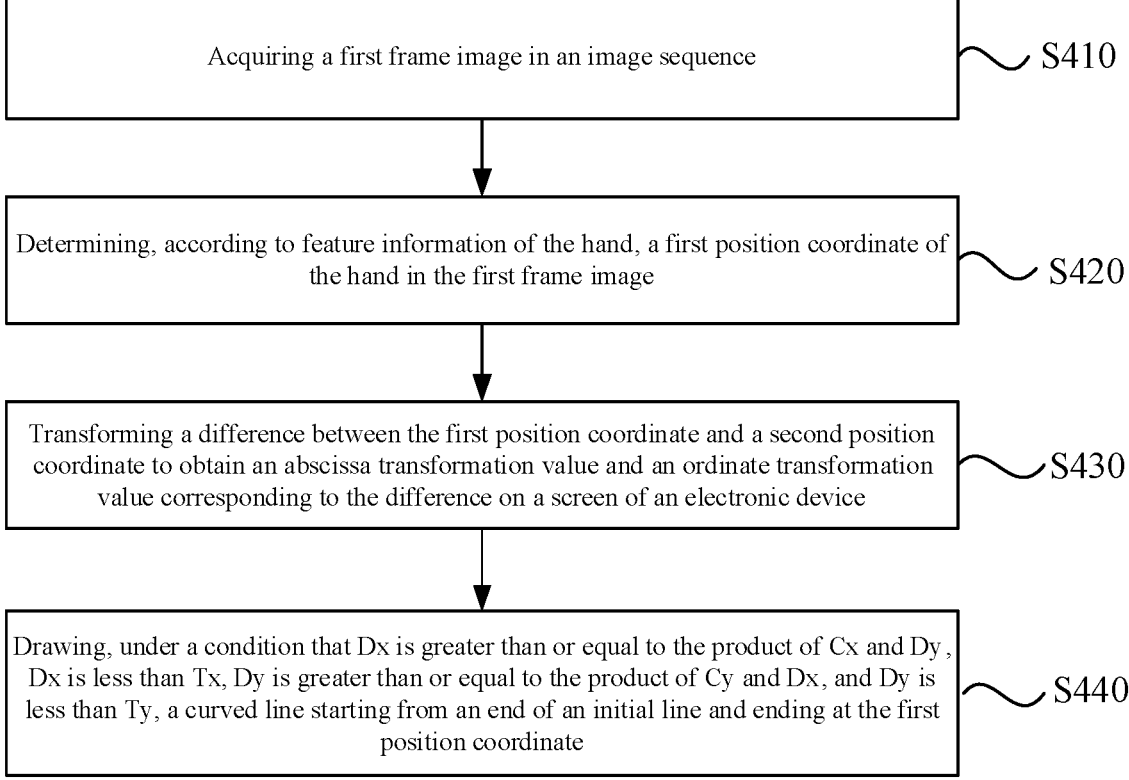
FIG. 4 is a flowchart of another line drawing method according to an embodiment of the present application.

Based on this, in one embodiment, as shown in FIG. 4, the line drawing method according to the embodiments of the present application may include the following steps:

S410, acquiring a first frame image in an image sequence;

S420, determining, according to feature information of the hand, a first position coordinate of the hand in the first frame image;

S430, transforming a difference between the first position coordinate and a second position coordinate to obtain an abscissa transformation value and an ordinate transformation value corresponding to the difference on a screen of an electronic device; and S440, drawing, under a condition that Dx is greater than or equal to the product of Cx and Dy, Dx is less than Tx, Dy is greater than or equal to the product of Cy and Dx, and Dy is less than Ty, a curved line starting from an end of an initial line and ending at the first position coordinate.

The processes of S410-S430 are the same as the processes of S210-S230 in FIG. 2, and specific reference may be made to the description of S210-S230, which is not repeated here for the sake of brevity.

Other steps in FIG. 4 are described in detail as follows:

In S440, under a condition that Dx is greater than or equal to the product of Cx and Dy, Dx is less than Tx, Dy is greater than or equal to the product of Cy and Dx, and Dy is less than Ty, it means that distances the hand moves along both the horizontal direction and the vertical direction are relatively large. Under this condition, the first position coordinate of the hand in the first frame image may be used as an end point, the end of the initial line may be connected to the first position coordinate to obtain an oblique line, and a smoothing process may be performed on the oblique line to obtain a smooth curved line, thereby satisfying user's requirement of drawing a smooth curved line.

In one embodiment, both a straight line and a curved line may need to be considered in certain scenarios, that is, both a straight line and a curved line may be drawn, and under this condition, Cx, Cy, Tx and Ty may satisfy the following condition:

Cx is less than the second set threshold, Cy is less than the third set threshold, Tx is less than the fourth set threshold, and Ty is less than the fifth set threshold.

That is, under a condition that Cx is less than the second set threshold, Cy is less than the third set threshold, Tx is less than the fourth set threshold, and Ty is less than the fifth set threshold, the straight line or the curved line may be drawn.

Magnitudes of the second set threshold, the third set threshold, the fourth set threshold, and the fifth set threshold may be set according to an actual requirement, the second set threshold and the third set threshold may be the same or different, and the fourth set threshold and the fifth set threshold may be the same or different.

In an example, the second set threshold and the third set threshold may be constants less than 0.2, and the fourth set threshold and the fifth set threshold may be constants less than 5.

In one embodiment, under a condition that Dy is greater than or equal to Ty, and Dx is greater than or equal to Tx, a curved line connecting the first position coordinate to the second position coordinate is drawn; under a condition that Dx is less than Tx, and Dx is greater than or equal to the product of Cx and Dy, a curved line connecting the first position coordinate to the second position coordinate is drawn; under a condition that Dx is less than Tx, and Dx is less than the product of Cx and Dy, a vertical line segment starting from the end of the initial line is drawn, and a length of the vertical line segment corresponds to Dy.

In one embodiment, under a condition that Dy<Ty, Dy is greater than or equal to the product of Cy and Dx, and Dx is greater than Tx, a curved line connecting the first position coordinate of the hand to the second position coordinate of the hand is drawn; under a condition that Dy is greater than or equal to the product of Cy and Dx, Dx is less than Tx, and Dx is greater than or equal to the product of Cx and Dy, a curved line connecting the first position coordinate to the second position coordinate is drawn; under a condition that Dy is greater than or equal to the product of Cy and Dx, Dx is less than Tx, and Dx is less than the product of Cx and Dy, a vertical line segment starting from the end of the initial line is drawn, and a length of the vertical line segment corresponds to Dy; under a condition that Dy is less than the product of Cy and Dx, and Dx is greater than Tx, a horizontal line segment starting from the end of the initial line is drawn, and a length of the horizontal line segment corresponds to Dx; under a condition that Dy is less than Cy and Dx, Dx is less than Tx, and Dx is greater than or equal to the product of Cx and Dy, a horizontal line segment starting from the end of the initial line is drawn, and a length of the horizontal line segment corresponds to Dx.

Accordingly, in a scenario where the straight line and the curved line need to be drawn at the same time, the transformation value coefficient and the transformation value threshold may be set as above, and under a condition that the abscissa transformation value, the ordinate transformation value, the transformation value coefficient, and the transformation value threshold satisfy the above relationship, a corresponding line is drawn to satisfy user's requirement of drawing a plurality of types of lines in the same scenario.

Figure 5:
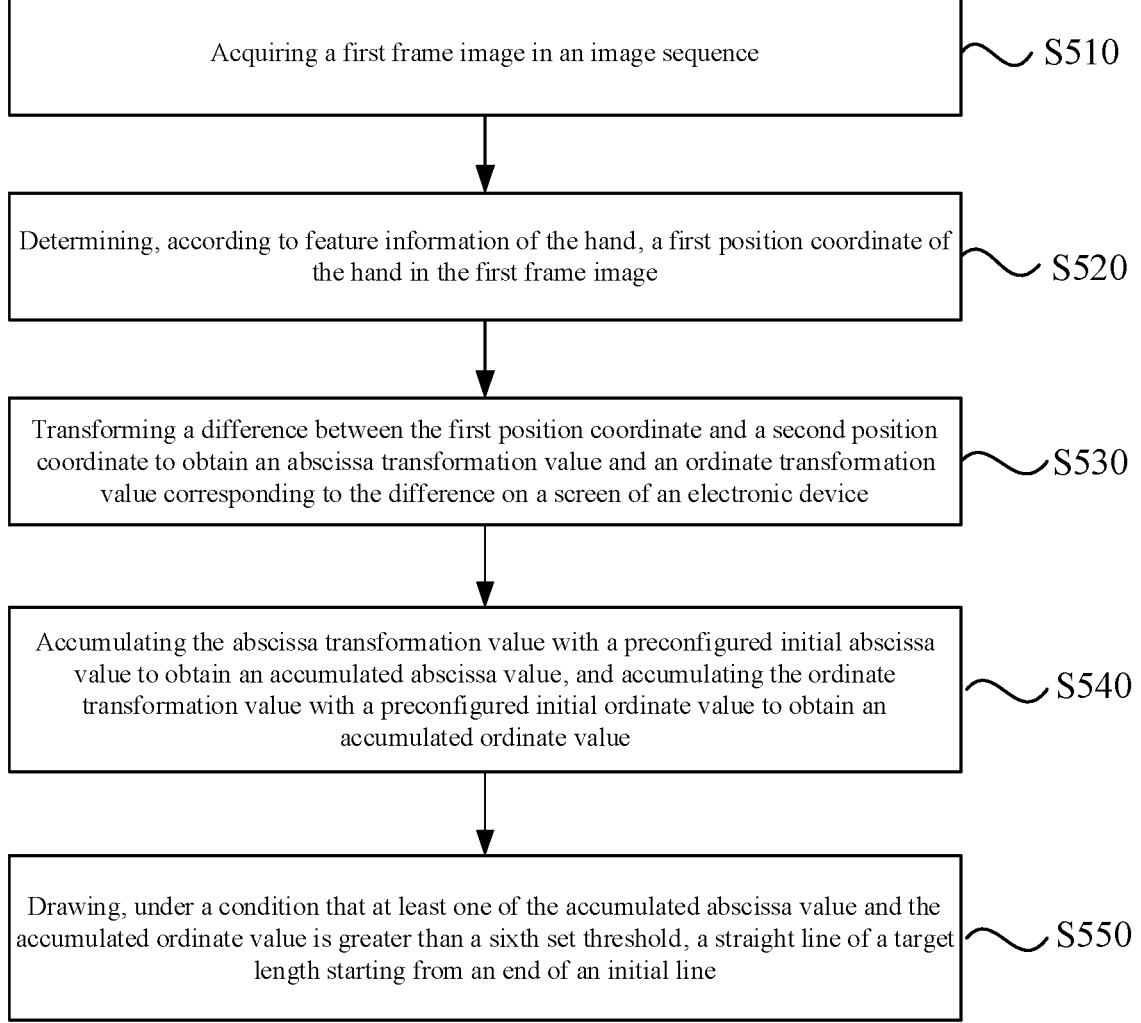
FIG. 5 is a flowchart of another line drawing method according to an embodiment of the present application.

In one embodiment, under a condition that both the abscissa transformation value and the ordinate transformation value are less than the first set threshold, as shown in FIG. 5, the line drawing method according to the embodiments of the present application may include the following steps:

S510, acquiring a first frame image in an image sequence;

S520, determining, according to feature information of the hand, a first position coordinate of the hand in the first frame image;

S530, transforming a difference between the first position coordinate and a second position coordinate to obtain an abscissa transformation value and an ordinate transformation value corresponding to the difference on a screen of an electronic device; and S540, accumulating the abscissa transformation value with a preconfigured initial abscissa value to obtain an accumulated abscissa value, and accumulating the ordinate transformation value with a preconfigured initial ordinate value to obtain an accumulated ordinate value; and S550, drawing, under a condition that at least one of the accumulated abscissa value and the accumulated ordinate value is greater than a sixth set threshold, a straight line of a target length starting from an end of an initial line, in which the target length corresponds to the accumulated abscissa value or the accumulated ordinate value.

The processes of S510-S530 are the same as the processes of S210-S230 in FIG. 2, and specific reference may be made to the description of S210-S230, which is not repeated here for the sake of brevity.

Other steps in FIG. 5 are described in detail as follows:

In S540, the initial abscissa value and the initial ordinate value are preconfigured constants for assisting in drawing a line under a condition that both Dx and Dy are relatively small. For convenience of description, the initial abscissa value may be marked as Ax, and the initial ordinate value may be marked as Ay. Initial values of Ax and Ay may be 0.

An example is given in which the first set threshold is 1, under a condition that Dx is less than 1, and Dy is less than 1, a transformation value may be accumulated, and then a line is drawn according to the accumulated transformation value. Accordingly, a situation can be avoided where the line is inaccurate due to a relatively small position change of the hand.

In an example, Dx may be accumulated with Ax to obtain the accumulated abscissa value; and Dy is accumulated with Ay to obtain the accumulated ordinate value.

In S550, for example, the sixth set threshold may be 1. In one embodiment, under a condition that at least one of the accumulated abscissa value and the accumulated ordinate value is greater than 1, the straight line starting from the end of the initial line may be drawn.

The types of the straight lines are related to a relationship between the accumulated abscissa value and the accumulated ordinate value. For example, under a condition that the accumulated abscissa value is greater than the accumulated ordinate value, the straight line is the horizontal straight line; under a condition that the accumulated abscissa value is less than or equal to the accumulated ordinate value, the straight line is the vertical straight line.

Based on this, in one embodiment, S550 may include the following steps:

drawing, under a condition that the accumulated abscissa value is greater than the accumulated ordinate value, a line segment of a third target length starting from the end of the initial line along a horizontal direction, in which the third target length corresponds to the accumulated abscissa value; and drawing, under a condition that the accumulated abscissa value is less than or equal to the accumulated ordinate value, a line segment of a fourth target length starting from the end of the initial line along a vertical direction, in which the fourth target length corresponds to the accumulated ordinate value.

The accumulated abscissa value being greater than the accumulated ordinate value means that a total distance the hand moves along the horizontal direction is greater than a total distance the hand moves along the vertical direction, and under this condition, the distance the hand moves along the vertical direction may be ignored, so that a line along the horizontal direction is obtained.

The accumulated abscissa value being less than the accumulated ordinate value means that the total distance the hand moves along the vertical direction is greater than the total distance the hand moves along the horizontal direction, and under this condition, the distance the hand moves along the horizontal direction may be ignored, so that a line along the vertical direction is obtained.

Accordingly, under a condition that both Dx and Dy are less than 1, the lines may be drawn in a cumulative manner, thereby ensuring the accuracy of the line.

It should be noted that, after this process is performed, Ax and Ay should be initialized, that is Ax and Ay should be cleared, so as to prevent Ax and Ay from affecting magnitudes of the accumulated abscissa value and the accumulated ordinate value, thereby not affecting the drawing of the line.

In one embodiment, under a condition that both the accumulated abscissa value and the accumulated ordinate value are less than 1, an abscissa transformation value and an ordinate transformation value of a second frame image may be accumulated with an abscissa transformation value and an ordinate transformation value of a previous frame image. It is assumed that all the abscissa transformation value and the ordinate transformation value of the second frame image and the abscissa transformation value and the ordinate transformation value of the previous frame image are less than 1, that is, both the accumulated abscissa transformation value and the accumulated ordinate transformation value are less than 1.

Figure 6:
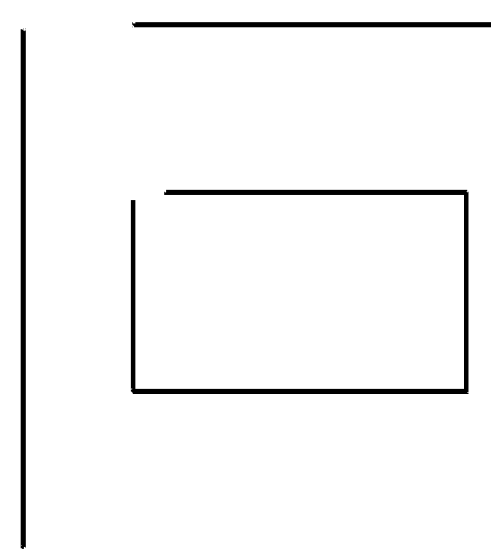
FIG. 6 is a schematic view of a line drawn based on the line drawing method according to an embodiment of the present application.

In one embodiment, an example is given in which a user draws a straight line along the horizontal direction and a straight line along the vertical direction, and the reference may be made to FIG. 6 for the lines drawn based on the line drawing method according to the embodiments of the present application. By comparing FIG. 6 with FIG. 1, it may be understood that, the lines drawn based on the line drawing method according to the embodiments of the present application may satisfy user's requirement of drawing the horizontal straight line and the vertical straight line, and the situation where the line is unstable due to hand instability is avoided.

Based on the same inventive concept, the embodiments of the present application further provides a line drawing apparatus, and the line drawing apparatus according to the embodiments of the present application will be described in detail with reference to FIG. 7.

Figure 7:
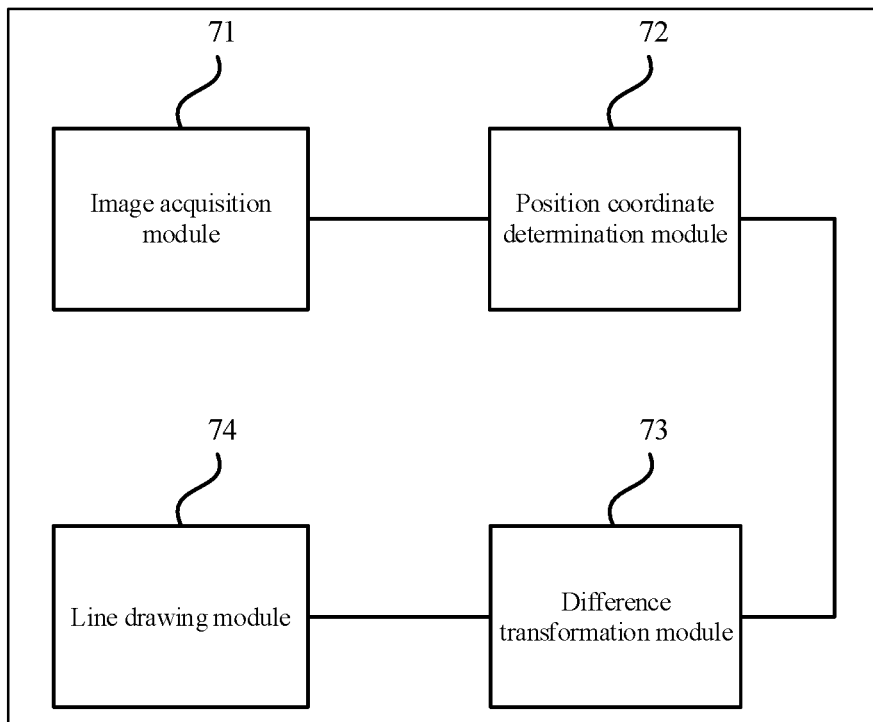
FIG. 7 is a structural view of a line drawing apparatus according to an embodiment of the present application.

As shown in FIG. 7, the line drawing apparatus may include:

an image acquisition module 71 configured to acquire a first frame image in an image sequence, in which the first frame image includes a hand of a user;

a position coordinate determination module 72 configured to determine, according to feature information of the hand, a first position coordinate of the hand in the first frame image;

a difference transformation module 73 configured to transform a difference between the first position coordinate and a second position coordinate to obtain an abscissa transformation value and an ordinate transformation value corresponding to the difference on a screen of an electronic device, in which the second position coordinate is a position coordinate of the hand in a second frame image, and the second frame image is an image before the first frame image in the image sequence; and a line drawing module 74 configured to draw, under a condition that at least one of the abscissa transformation value and the ordinate transformation value is not less than a first set threshold, a corresponding line according to an association relationship among the abscissa transformation value, the ordinate transformation value, a preconfigured transformation value coefficient, and a transformation value threshold.

In one embodiment, the transformation value coefficient includes an abscissa transformation value coefficient and an ordinate transformation value coefficient, and the transformation value threshold includes an abscissa transformation value threshold and an ordinate transformation value threshold;

the line drawing module 74 includes:

a straight line drawing unit configured to draw, under a condition that a product of the abscissa transformation value coefficient and the ordinate transformation value coefficient is a first preset value, the abscissa transformation value threshold is a second preset value, and the ordinate transformation value threshold is a third preset value, a straight line of a target length starting from an end of an initial line, in which the initial line is a line drawn according to an image before the first frame image in the image sequence, and the target length corresponds to the abscissa transformation value or the ordinate transformation value.

In one embodiment, the straight line drawing unit may be configured to:

draw, under a condition that the abscissa transformation value is greater than or equal to a product of the abscissa transformation value coefficient and the ordinate transformation value, and the ordinate transformation value is less than the ordinate transformation value threshold, a line segment of a first target length starting from the end of the initial line along a horizontal direction, in which the first target length corresponds to the abscissa transformation value.

In one embodiment, the straight line drawing unit may be configured to:

draw, under a condition that the ordinate transformation value is greater than or equal to a product of the ordinate transformation value coefficient and the abscissa transformation value, and the abscissa transformation value is less than the abscissa transformation value threshold, a line segment of a second target length starting from the end of the initial line along a vertical direction, in which the second target length corresponds to the ordinate transformation value.

In one embodiments, the transformation value coefficient includes an abscissa transformation value coefficient and an ordinate transformation value coefficient, and the transformation value threshold includes an abscissa transformation value threshold and an ordinate transformation value threshold;

the line drawing module 74 includes:

a curved line drawing unit configured to, under a condition that the abscissa transformation value coefficient is a fourth preset value, the ordinate transformation value coefficient is a fifth preset value, the abscissa transformation value threshold is a sixth preset value, and the ordinate transformation value threshold is a seventh preset value, and under a condition that the abscissa transformation value is greater than or equal to a product of the abscissa transformation value coefficient and the ordinate transformation value, the abscissa transformation value is less than the abscissa transformation value threshold, the ordinate transformation value is greater than or equal to a product of the ordinate transformation value coefficient and the abscissa transformation value, and the ordinate transformation value is less than the ordinate transformation value threshold, draw a curved line starting from an end of an initial line and ending at the first position coordinate, in which the initial line is a line drawn according to an image before the first frame image in the image sequence.

In one embodiment, the transformation value coefficient includes an abscissa transformation value coefficient and an ordinate transformation value coefficient, and the transformation value threshold includes an abscissa transformation value threshold and an ordinate transformation value threshold;

the line drawing module 74 includes:

a multi-line drawing unit configured to draw, under a condition that the abscissa transformation value coefficient is less than a second set threshold, the ordinate transformation value coefficient is less than a third set threshold, the abscissa transformation value threshold is less than a fourth set threshold, and the ordinate transformation value threshold is less than a fifth set threshold, a straight line or a curved line starting from an end of the initial line, in which the initial line is a line drawn according to an image before the first frame image in the image sequence.

In one embodiment, the apparatus further includes:

an accumulation module configured to, under a condition that both the abscissa transformation value and the ordinate transformation value are less than a first set threshold, accumulate the abscissa transformation value with a preconfigured initial abscissa value to obtain an accumulated abscissa value, and accumulate the ordinate transformation value with a preconfigured initial ordinate value to obtain an accumulated ordinate value; and a straight line drawing unit configured to draw, under a condition that at least one of the accumulated abscissa value and the accumulated ordinate value is greater than a sixth set threshold, a straight line of a target length starting from an end of an initial line, wherein the initial line is a line drawn according to an image before the first frame image in the image sequence, and the target length corresponds to the accumulated abscissa value or the accumulated ordinate value.

In one embodiment, the straight line drawing unit may be configured to:

draw, under a condition that the accumulated abscissa value is greater than the accumulated ordinate value, a line segment of a third target length starting from the end of the initial line along a horizontal direction, wherein the third target length corresponds to the accumulated abscissa value; and draw, under a condition that the accumulated abscissa value is less than or equal to the accumulated ordinate value, a line segment of a fourth target length starting from the end of the initial line along a vertical direction, wherein the fourth target length corresponds to the accumulated ordinate value;

draw, under a condition that at least one of the abscissa transformation value and the ordinate transformation value is not less than a first set threshold, a corresponding line according to an association relationship among the abscissa transformation value, the ordinate transformation value, a preconfigured transformation value coefficient, and a transformation value threshold. That is, in the embodiments of the present application, when drawing the line, not only position changes of the hand in different frame images are considered, but also the association relationship among the position changes, the transformation value coefficient, and the transformation value threshold is considered. Therefore, when drawing the line, only a line corresponding to the association relationship can be drawn, and a line unrelated to the association relationship cannot be drawn. Thus, a situation in which the line that is actually drawn is inconsistent with the type of the line due to inertia or the like can be avoided, thereby ensuring the stability of the line.

The various modules and units in the apparatus shown in FIG. 7 have the functions of implementing the various steps in FIG. 2 to FIG. 5, and can achieve corresponding technical effects, which is not repeated here for the sake of brevity.

Based on the same inventive concept, the embodiments of the present application further provide an electronic device, and the electronic device according to the embodiments of the present application will be described in detail with reference to FIG. 8.

Figure 8:
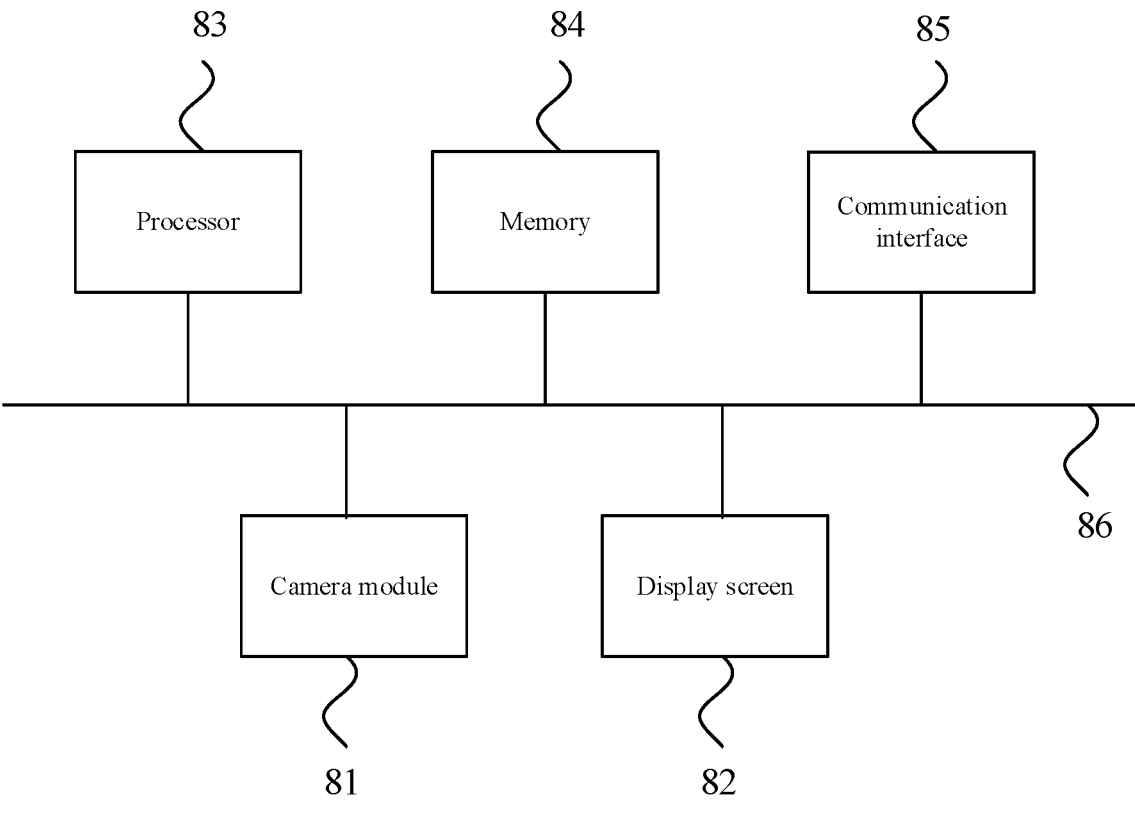
FIG. 8 is a structural view of an electronic device according to an embodiment of the present application.

As shown in FIG. 8, the electronic device may include a camera module 81, a display screen 82, a processor 83, and a memory 84.

The camera module 81 is configured to acquire an image, and in an example of the embodiments of the present application, the camera module 81 is integrated in the electronic device.

The display screen 82 may be an apparatus having a display function, such as an apparatus configured to display the drawn line in the embodiments of the present application, and, of course, display other content.

The display screen 82 may be integrated in the electronic device or may be separate from the main body of the electronic device. Under a condition that the display screen 82 is separate from the main body of the electronic device, and the electronic device needs to display information through the display screen 82, a communication connection may be established with the display screen 82.

In addition to the display function, the display screen 82 may further have a touch control function. For example, the display screen 82 may further be a touch control screen integrating the display function and the touch control function.

The memory 84 is used for storing computer program instructions.

The processor 83 may include a Central Processing Unit (CPU), or an Application Specific Integrated Circuit (ASIC), or one or more integrated circuits that may be configured to implement the embodiments of the present application.

The memory 84 may include a mass memory for storing data or instructions. By way of example and not limitation, memory 84 may include a Hard Disk Drive (HDD), a floppy disk drive, a flash memory, an optical disk, a magnetic disk, a magnetic tape, or a Universal Serial Bus (USB) drive, or a combination thereof. In one example, the memory 84 may include a removable or non-removable (or fixed) medium, or the memory 84 is a non-volatile solid state memory. In one instance, the memory 84 may be a Read Only Memory (ROM). In one instance, the ROM may be a mask programmed ROM, a programmable ROM (PROM), an erasable PROM (EPROM), an electrically erasable PROM (EEPROM), an electrically alterable ROM (EAROM), or a flash memory, or a combination thereof.

The processor 83 reads and executes the computer program instructions stored in the memory 84 to implement the method in the embodiments shown in FIG. 2 to FIG. 5, and achieve the corresponding technical effects achieved by the embodiments shown in FIG. 2 to FIG. 5 performing other methods, which is not repeated here for the sake of brevity.

In one example, the electronic device may further include a communication interface 85 and a bus 86. As shown in FIG. 8, the camera module 81, the display screen 82, the processor 83, the memory 84, and the communication interface 85 are connected through the bus 86 and achieve mutual communication with each other.

The communication interface 85 is mainly configured to achieve the communication among the various modules, apparatuses, and/or devices in the embodiments of the present application.

The bus 86 includes hardware, software, or both, to couple the various components of the electronic device with each other. By way of example and not limitation, the bus 86 may include an Accelerated Graphics Port (AGP) or other graphics buses, an Enhanced Industry Standard Architecture (EISA) bus, a Front Side Bus (FSB), a HyperTransport (HT) interconnect, an Industry Standard Architecture (ISA) bus, an infinite bandwidth interconnect, a Low Pin Count (LPC) bus, a memory bus, a Micro Channel Architecture (MCA) bus, a Peripheral Component Interconnect (PCI) bus, a PCI-Express (PCI-X) bus, a Serial Advanced Technology Attachment (SATA) bus, a Video Electronics Standards Association Local Bus (VLB) bus, or other suitable buses, or a combination thereof. When appropriate, the bus 86 may include one or more buses. Although specific buses are described and illustrated in the embodiments of the present application, the present application contemplates any suitable bus or interconnect.

The electronic device may perform the line drawing method in the embodiments of the present application based on the first frame image in the acquired image sequence, thereby implementing the line drawing method described with respect to FIG. 2 to FIG. 5 and the line drawing apparatus described with respect to FIG. 7.

In addition, the embodiments of the present application may provide a computer storage medium for implementing the line drawing methods in the above embodiments. The computer storage medium stores computer program instructions thereon, the computer program instructions, when executed by the processor, perform any of the line drawing methods of the above embodiments. An example of the computer storage medium includes non-transitory storage media such as an electronic circuit, a semiconductor memory device, a ROM, a flash memory, an erasable ROM (EROM), a floppy disk, a CD-ROM, an optical disk, a hard disk and the like.

It should be noted that, the present application is not limited to the specific configuration and processing described above and shown in the drawings. For the sake of brevity, a detailed description of the known method is omitted here. In the embodiments, several specific steps are described and shown as examples. However, the method process of the present application is not limited to the specific steps described and shown, and those skilled in the art can make various changes, modifications and additions, or change the sequence of steps after comprehending the gist of the present application.

The functional blocks shown in the structural block diagrams may be implemented as hardware, software, firmware, or a combination thereof. When implemented as hardware, it may be, for example, an electronic circuit, an application specific integrated circuit (ASIC), suitable firmware, a plug-in, a functional card, and the like. When implemented as software, elements of the present application are programs or code segments used to perform required tasks. The programs or code segments may be stored in a machine-readable medium, or transmitted on a transmission medium or a communication link through a data signal carried in a carrier wave. A "machine-readable medium" may include any medium that can store or transmit information. An example of the machine-readable medium includes an electronic circuit, a semiconductor memory device, a ROM, a flash memory, an erasable ROM (EROM), a floppy disk, a CD-ROM, an optical disk, a hard disk, a fiber optic medium, a radio frequency (RF) link, and the like. The code segments may be downloaded via a computer network such as the Internet, intranet, and the like.

It should also be noted that, according to the exemplary embodiments described in the present application, some methods or systems are described based on a series of steps or apparatuses. However, the present application is not limited to the order of the steps, that is, the steps may be executed in the order described in the embodiments or in orders different from that in the embodiments, or several steps may be executed at the same time.

Aspects of the embodiments of the present application are described above with reference to flowchart illustrations and/or block diagrams of methods, apparatuses (systems) and computer program products according to the embodiments of the present application. It should be understood that the each block of flowchart illustrations and/or the block diagrams, and a combination of various blocks of the flowchart illustrations and/or the block diagrams may be implemented by the computer program instructions. These computer program instructions may be provided to a processor of a general purpose computer, special purpose computer, or other programmable data processing apparatuses to produce a machine such that execution of the instructions via the processor of the computer or other programmable data processing apparatuses enables the implementation of the functions/actions specified in one or more blocks of the flowchart illustrations and/or block diagrams. Such processor may be but is not limited to a general purpose processor, a special purpose processor, an application specific processor, or a field programmable logic circuit. It should also be understood that each block of the block diagrams and/or the flowchart illustrations, and the combination of blocks of the block diagrams and/or the flowchart illustrations may also be implemented by special purpose hardware that performs specified functions or actions, or by the combination of the special purpose hardware and computer instructions.

The above are only specific implementations of the present application, those skilled in the art may clearly understand that the specific working processes of the above systems, modules and units may be referred to the corresponding processes in the foregoing method embodiments, which is not repeated here for the convenience and brevity of the description. It should be understood that the protection scope of the present application is not limited to this, and any person skilled in the art can easily think of various equivalent modifications or replacements within the technical scope disclosed in the present application, and these modifications or replacements should all be covered within the scope of protection of the present application.

What is claimed is:

1. A line drawing method, comprising:
acquiring a first frame image in an image sequence, wherein the first frame image comprises a hand of a user;
determining, according to feature information of the hand, a first position coordinate of the hand in the first frame image;
transforming a difference between the first position coordinate and a second position coordinate to obtain an abscissa transformation value and an ordinate transformation value corresponding to the difference on a screen of an electronic device, wherein the second position coordinate is a position coordinate of the hand in a second frame image, and the second frame image is an image before the of the first frame image in the image sequence; and
drawing, under a condition that at least one of the abscissa transformation value and the ordinate transformation value is not less than a first set threshold, a corresponding line according to an association relationship among the abscissa transformation value, the ordinate transformation value, a preconfigured transformation value coefficient, and a transformation value threshold,
wherein the method further comprises:
under a condition that both the abscissa transformation value and the ordinate transformation value are less than a first set threshold, accumulating the abscissa transformation value with a preconfigured initial abscissa value to obtain an accumulated abscissa value, and accumulating the ordinate transformation value with a preconfigured initial ordinate value to obtain an accumulated ordinate value; and
drawing, under a condition that at least one of the accumulated abscissa value and the accumulated ordinate value is greater than a sixth set threshold, a straight line of a target length starting from an end of an initial line, wherein the initial line is a line drawn according to an image before the first frame image in the image sequence, and the target length corresponds to the accumulated abscissa value or the accumulated ordinate value.

2. The method according to claim 1, wherein the transformation value coefficient comprises an abscissa transformation value coefficient and an ordinate transformation value coefficient, and the transformation value threshold comprises an abscissa transformation value threshold and an ordinate transformation value threshold; and
drawing the corresponding line according to the association relationship among the abscissa transformation value, the ordinate transformation value, the preconfigured transformation value coefficient, and the transformation value threshold comprises:

drawing, under a condition that a product of the abscissa transformation value coefficient and the ordinate transformation value coefficient is a first preset value, the abscissa transformation value threshold is a second preset value, and the ordinate transformation value threshold is a third preset value, a straight line of a target length starting from an end of an initial line, wherein the initial line is a line drawn according to an image before the first frame image in the image sequence, and the target length corresponds to the abscissa transformation value or the ordinate transformation value.

3. The method according to claim 2, wherein drawing the straight line of the target length starting from the end of the initial line comprises:

drawing, under a condition that the abscissa transformation value is greater than or equal to a product of the abscissa transformation value coefficient and the ordinate transformation value, and the ordinate transformation value is less than the ordinate transformation value threshold, a line segment of a first target length starting from the end of the initial line along a horizontal direction, wherein the first target length corresponds to the abscissa transformation value.

4. The method according to claim 2, wherein drawing the straight line of the target length starting from the end of the initial line comprises:

drawing, under a condition that the ordinate transformation value is greater than or equal to a product of the ordinate transformation value coefficient and the abscissa transformation value, and the abscissa transformation value is less than the abscissa transformation value threshold, a line segment of a second target length starting from the end of the initial line along a vertical direction, wherein the second target length corresponds to the ordinate transformation value.

5. The method according to claim 1, wherein the transformation value coefficient comprises an abscissa transformation value coefficient and an ordinate transformation value coefficient, and the transformation value threshold comprises an abscissa transformation value threshold and an ordinate transformation value threshold; and drawing the corresponding line according to the association relationship among the abscissa transformation value, the ordinate transformation value, the preconfigured transformation value coefficient, and the transformation value threshold comprises:

under a condition that the abscissa transformation value coefficient is a fourth preset value, the ordinate transformation value coefficient is a fifth preset value, the abscissa transformation value threshold is a sixth preset value, and the ordinate transformation value threshold is a seventh preset value, and under a condition that the abscissa transformation value is greater than or equal to a product of the abscissa transformation value coefficient and the ordinate transformation value, the abscissa transformation value is less than the abscissa transformation value threshold, the ordinate transformation value is greater than or equal to a product of the ordinate transformation value coefficient and the abscissa transformation value, and the ordinate transformation value is less than the ordinate transformation value threshold, drawing a curved line starting from an end of an initial line and ending at the first position coordinate, wherein the initial line is a line drawn according to an image before the first frame image in the image sequence.

6. The method according to claim 1, wherein the transformation value coefficient comprises an abscissa transformation value coefficient and an ordinate transformation value coefficient, and the transformation value threshold comprises an abscissa transformation value threshold and an ordinate transformation value threshold; and drawing the corresponding line according to the association relationship among the abscissa transformation value, the ordinate transformation value, the preconfigured transformation value coefficient, and the transformation value threshold comprises:

drawing, under a condition that the abscissa transformation value coefficient is less than a second set threshold, the ordinate transformation value coefficient is less than a third set threshold, the abscissa transformation value threshold is less than a fourth set threshold, and the ordinate transformation value threshold is less than a fifth set threshold, a straight line or a curved line starting from an end of the initial line, wherein the initial line is a line drawn according to an image before the first frame image in the image sequence.

7. The method according to claim 1, wherein drawing the straight line of the target length starting from the end of the initial line comprises:

drawing, under a condition that the accumulated abscissa value is greater than the accumulated ordinate value, a line segment of a third target length starting from the end of the initial line along a horizontal direction, wherein the third target length corresponds to the accumulated abscissa value; and drawing, under a condition that the accumulated abscissa value is less than or equal to the accumulated ordinate value, a line segment of a fourth target length starting from the end of the initial line along a vertical direction, wherein the fourth target length corresponds to the accumulated ordinate value.

8. A non-transitory computer readable storage medium having computer program instructions stored thereon, wherein the computer program instructions, when executed by a processor, implement the method according to claim 1.

9. An electronic device, comprising:

a camera module configured to acquire an image;

a display screen configured to display a line;

a processor;

a memory for storing computer program instructions, wherein the computer program instructions, when executed by the processor, implement operations comprising:

acquiring a first frame image in an image sequence, wherein the first frame image comprises a hand of a user;

determining, according to feature information of the hand, a first position coordinate of the hand in the first frame image;

transforming a difference between the first position coordinate and a second position coordinate to obtain an abscissa transformation value and an ordinate transformation value corresponding to the difference on a screen of an electronic device, wherein the second position coordinate is a position coordinate of the hand in a second frame image, and the second frame image is an image before the of the first frame image in the image sequence; and drawing, under a condition that at least one of the abscissa transformation value and the ordinate transformation value is not less than a first set threshold, a correspond-ing line according to an association relationship among the abscissa transformation value, the ordinate trans-formation value, a preconfigured transformation value coefficient, and a transformation value threshold, wherein the operations further comprise:

under a condition that both the abscissa transformation value and the ordinate transformation value are less than a first set threshold, accumulating the abscissa transformation value with a preconfigured initial abscissa value to obtain an accumulated abscissa value, and accumulating the ordinate transformation value with a preconfigured initial ordinate value to obtain an accumulated ordinate value; and drawing, under a condition that at least one of the accu-mulated abscissa value and the accumulated ordinate value is greater than a sixth set threshold, a straight line of a target length starting from an end of an initial line, wherein the initial line is a line drawn according to an image before the first frame image in the image sequence, and the target length corresponds to the accumulated abscissa value or the accumulated ordi-nate value.

10. The electronic device according to claim 9, wherein the transformation value coefficient comprises an abscissa transformation value coefficient and an ordinate transforma-tion value coefficient, and the transformation value threshold comprises an abscissa transformation value threshold and an ordinate transformation value threshold; and drawing the corresponding line according to the associa-tion relationship among the abscissa transformation value, the ordinate transformation value, the precon-figured transformation value coefficient, and the trans-formation value threshold comprises:

drawing, under a condition that a product of the abscissa transformation value coefficient and the ordinate trans-formation value coefficient is a first preset value, the abscissa transformation value threshold is a second preset value, and the ordinate transformation value threshold is a third preset value, a straight line of a target length starting from an end of an initial line, wherein the initial line is a line drawn according to an image before the first frame image in the image sequence, and the target length corresponds to the abscissa transformation value or the ordinate transfor-mation value.

11. The electronic device according to claim 10, wherein drawing the straight line of the target length starting from the end of the initial line comprises:

drawing, under a condition that the abscissa transforma-tion value is greater than or equal to a product of the abscissa transformation value coefficient and the ordi-nate transformation value, and the ordinate transforma-tion value is less than the ordinate transformation value threshold, a line segment of a first target length starting from the end of the initial line along a horizontal direction, wherein the first target length corresponds to the abscissa transformation value.

12. The electronic device according to claim 10, wherein drawing the straight line of the target length starting from the end of the initial line comprises:

drawing, under a condition that the ordinate transforma-tion value is greater than or equal to a product of the ordinate transformation value coefficient and the abscissa transformation value, and the abscissa trans-formation value is less than the abscissa transformation value threshold, a line segment of a second target length starting from the end of the initial line along a vertical direction, wherein the second target length corresponds to the ordinate transformation value.

13. The electronic device according to claim 9, wherein the transformation value coefficient comprises an abscissa transformation value coefficient and an ordinate transforma-tion value coefficient, and the transformation value threshold comprises an abscissa transformation value threshold and an ordinate transformation value threshold; and drawing the corresponding line according to the associa-tion relationship among the abscissa transformation value, the ordinate transformation value, the precon-figured transformation value coefficient, and the trans-formation value threshold comprises:

under a condition that the abscissa transformation value coefficient is a fourth preset value, the ordinate trans-formation value coefficient is a fifth preset value, the abscissa transformation value threshold is a sixth preset value, and the ordinate transformation value threshold is a seventh preset value, and under a condition that the abscissa transformation value is greater than or equal to a product of the abscissa transformation value coefficient and the ordinate trans-formation value, the abscissa transformation value is less than the abscissa transformation value threshold, the ordinate transformation value is greater than or equal to a product of the ordinate transformation value coefficient and the abscissa transformation value, and the ordinate transformation value is less than the ordi-nate transformation value threshold, drawing a curved line starting from an end of an initial line and ending at the first position coordinate, wherein the initial line is a line drawn according to an image before the first frame image in the image sequence.

14. The electronic device according to claim 9, wherein the transformation value coefficient comprises an abscissa transformation value coefficient and an ordinate transforma-tion value coefficient, and the transformation value threshold comprises an abscissa transformation value threshold and an ordinate transformation value threshold; and drawing the corresponding line according to the associa-tion relationship among the abscissa transformation value, the ordinate transformation value, the precon-figured transformation value coefficient, and the trans-formation value threshold comprises:

drawing, under a condition that the abscissa transforma-tion value coefficient is less than a second set threshold, the ordinate transformation value coefficient is less than a third set threshold, the abscissa transformation value threshold is less than a fourth set threshold, and the ordinate transformation value threshold is less than a fifth set threshold, a straight line or a curved line starting from an end of the initial line, wherein the initial line is a line drawn according to an image before the first frame image in the image sequence.

15. The electronic device according to claim 9, wherein drawing the straight line of the target length starting from the end of the initial line comprises:

drawing, under a condition that the accumulated abscissa value is greater than the accumulated ordinate value, a line segment of a third target length starting from the end of the initial line along a horizontal direction, wherein the third target length corresponds to the accumulated abscissa value; and drawing, under a condition that the accumulated abscissa value is less than or equal to the accumulated ordinate value, a line segment of a fourth target length starting from the end of the initial line along a vertical direction, wherein the fourth target length corresponds to the accumulated ordinate value.

\* \* \* \* \*